United States Patent [19]
Stine et al.

[11] Patent Number: 5,847,252
[45] Date of Patent: Dec. 8, 1998

[54] PROCESS FOR INTEGRATED OLIGOMER PRODUCTION AND SATURATION

[75] Inventors: Laurence O. Stine, Western Springs; Bipin V. Vora, Darien; Harold U. Hammershaimb, Western Springs, all of Ill.

[73] Assignee: UOP LLC, Des Plaines, Ill.

[21] Appl. No.: 573,089

[22] Filed: Dec. 15, 1995

[51] Int. Cl.$^6$ .............................. C07C 2/08; C07C 5/32
[52] U.S. Cl. ........................ 585/330; 585/310; 208/62; 208/64; 208/66
[58] Field of Search .................... 585/330, 310; 208/62, 64, 66

[56] References Cited

U.S. PATENT DOCUMENTS

| | | | |
|---|---|---|---|
| 2,526,966 | 10/1950 | Oberfell et al. | 196/1 |
| 4,304,948 | 12/1981 | Vora et al. | 585/315 |
| 4,367,356 | 1/1983 | Ward | 585/315 |
| 4,393,259 | 7/1983 | Ward et al. | 585/315 |
| 4,416,804 | 11/1983 | Antos et al. | 502/213 |
| 4,678,645 | 7/1987 | Chang et al. | 422/190 |
| 4,749,820 | 6/1988 | Kuo et al. | 585/330 |
| 5,049,360 | 9/1991 | Harandi et al. | 422/141 |

FOREIGN PATENT DOCUMENTS

2186287  2/1987  United Kingdom .

Primary Examiner—Walter D. Griffin
Assistant Examiner—Nadine Preisch
Attorney, Agent, or Firm—Thomas K. McBride; John G. Tolomei

[57] ABSTRACT

A process for the production motor fuel components from isoparaffins by dehydrogenation, oligomerization and saturation uses a combination of low severity dehydrogenation, first and second feed input locations and a primary separation column that receives feed and effluent components to deliver a dehydrogenation zone feed and a motor fuel products. A separation column receives the an isobutane input stream and a product containing effluent stream to distill a dehydrogenation zone input steam. The dehydrogenation zone operates at low severity conditions to produce the effluent stream that compliments the operation of an oligomerization zone by delivering an effluent stream that is higher in pressure and contains inert paraffinic diluent materials. The oligomerization effluent passes to a saturation reaction zone that provides a saturated effluent stream. The saturation zone effluent is divided to provide quench to both the oligomerization reaction zone and the saturation zone and saturated motor fuel components to the separation column.

16 Claims, 1 Drawing Sheet

PROCESS FOR INTEGRATED OLIGOMER PRODUCTION AND SATURATION

FIELD OF THE INVENTION

This invention relates generally to the production of gasoline boiling range hydrocarbons by the dehydrogenation of light paraffins, the oligomerization of light olefins and the hydrogenation of the resulting oligomers.

BACKGROUND OF THE INVENTION

PRIOR ART

A continuing demand exists for the conversion of isobutane and light olefins into high octane motor fuels. The alkylation of isobutane with propylene, butenes and amylenes using a hydrofluoric acid (HF) catalyst, commonly referred to as HF alkylation, has provided a highly successful method for the production of high octane motor fuels. Despite a long history of safe operation, recent concerns over the possibility of a catastrophic release of HF acid from HF alkylation units has prompted the investigation of modifications or alternatives to the HF alkylation process for the production of motor fuels. One existing alternative is a similar alkylation process that uses sulfuric acid as the catalyst. While the use of sulfuric acid may decrease the degree of the hazard that some associate with the use of HF acid, sulfuric acid processes is still perceived as possibly presenting the same hazard and is not as economically advantageous as the HF alkylation process. Therefore, processing substitutes for the HF alkylation process are still sought.

Other methods of combining isobutane with light olefins to produce motor fuels are known and practiced but, do not produce the same quality gasoline products or are more expensive to install and operate. One such alternative is the dehydrogenation of butanes and the oligomerization of the resulting olefins to produce gasoline boiling range hydrocarbons. The oligomerization of light olefins into higher molecular weight motor fuels using a solid phosphoric acid is well known and its use predates the HF alkylation process. Such oligomerization processes are also referred to as catalytic condensation and polymerization with the resulting motor fuel often referred to as polymer gasoline. Patents disclosing the dehydrogenation of light paraffin stream with oligomerization of the dehydrogenation effluent include U.S. Pat No. 4,393,259, U.S. Pat. No. 5,049,360, U.S. Pat No. 4,749,820, U.S. Pat. No. 4,304,948 and U.S. Pat. No. 2,526,966.

It also known to hydrotreat the olefinic hydrocarbon streams produced by oligomerization to saturate olefins. Patent GB 2186287 discloses dehydrogenation of and oligomerization of a C4 fraction to produce a jet aircraft fuel that is optionally hydrogenated and premium gasoline. The hydrotreatment of jet fuels, diesel fuels and lubes produced by dehydrogenation and oligomerization of light paraffins is disclosed in U.S. Pat. No. 4,678,645. However, hydrotreating is not always beneficial for gasoline fractions produced by oligomerization and can lower octane ratings, but is known to be particularly beneficial when saturating isooctenes to isooctane gasoline.

It is an object of this invention to provide an alternative to HF alkylation for the combination of isobutane with light olefins that advantageously produces a comparable motor fuel product in a uniquely integrated series of dehydrogenation, oligomerization and saturation steps.

BRIEF SUMMARY OF THE INVENTION

This invention integrates the dehydrogenation of an isobutane containing stream with the oligomerization of the resulting isobutenes and an olefin containing stream in a process that hydrotreats the oligomerization effluent to efficiently produce a motor fuel equivalent to that produced by HF allylation. The low conversion dehydrogenation zone reduces operational costs and complements the operation of the oligomerization zone. The dehydrogenation zone operates at low conversion conditions which results in a large excess of unreacted feed components passing through the oligomerization zone. The unreacted feed components serve as a necessary diluent to control temperatures in the highly exothermic operation of the oligomerization zone. The low conversion conditions in the dehydrogenation unit have also been found to reduce the production of coke and the required size of the regeneration facilities. An additional input stream comprising light olefins is combined with the isobutene from the dehydrogenation zone to provide additional olefinic reactants for the oligomerization zone. The additional input stream has a composition that will give the feed to the oligomerization zone an isobutene to normal olefin weight ratio of at least 0.35. The oligomerization zone effluent together with hydrogen from the dehydrogenation zone enters a hydrogenation reactor that saturates the olefinic effluent components. After separation of hydrogen, the effluent from the hydrogenation reactor enters the primary fractionator for recovery of a product stream having a quality equivalent to that obtained from an HF alkylation process. Thus, through the integration of the dehydrogenation zone operation with the oligomerization reaction zone, the input and recovery of feed components and products from a primary fractionator operated as a deisobutanizer and the addition of a secondary olefin feed the invention surprisingly provides an effective substitute for an HF process that eliminates the environmental hazards associated with the HF alkylation process.

In a preferred embodiment the invention uses a primary fractionator in the form of a deisobutanizer column to supply feed to a low conversion dehydrogenation zone and recover motor fuel product components. In this preferred integration of this invention the isobutane containing input stream enters the process via the primary fractionator that provides a sidecut to supply the isobutane feed stream to the dehydrogenation zone.

Accordingly in a broad embodiment this invention is a process for the production of a motor fuel product. The process passes at least a portion of a first input comprising isobutane and a fraction of a saturation zone effluent stream comprising C4 hydrocarbons to a dehydrogenation zone that contacts C4 hydrocarbons in the dehydrogenation zone with a dehydrogenation catalyst at dehydrogenation conditions. The dehydrogenation conditions include a temperature of 950° to 1200° F., a pressure of about 30 to 150 psig and an LHSV of 0.5–50. After separation of hydrogen, at least a portion of the dehydrogenation effluent comprising C4 isoolefins and at least 50wt % isobutane passes from the dehydrogenation zone and enters an oligomerization zone along with a second input stream comprising C3 to C5 olefins that together supply an oligomerization zone feed. (Unless otherwise noted the term "portion" in this specification when describing a process stream refers to either an aliquot portion of the stream or a dissimilar fraction of the stream having a different composition than the total stream from which it was derived.) The oligomerization zone contacts the feed with a solid oligomerization catalyst at oligomerization conditions including a temperature of 200° to 500° F., a pressure of 200 to 1200 psig, and an LHSV of 0.8 to 5 to recover an oligomerization effluent comprising C7 and higher isoolefins. The oligomerization zone effluent and hydrogen from the dehydrogenation zone passes to a saturation zone that saturates the olefins by contact with a saturation catalyst at saturation conditions. Effluent from the saturation zone, containing gasoline boiling range products and unreacted isobutane provides a recycle stream that enters the separation zone. A motor fuel product stream is recovered from the separation zone.

The integration of the process steps in the manner of this invention provides multiple benefits to the operation of each process step in a number of unexpected ways. The process beneficially integrates hydrogen consumption and production between the dehydrogenation zone and the saturation reaction zone. The process also integrates a low severity dehydrogenation step to provide direct benefits to the dehydrogenation unit of reduced catalyst deactivation and simplified hydrogen management. The integrated process operates with lower hydrogen to hydrocarbon ratios that reduce the overall circulation of hydrogen. The integrated process can also circulate hydrogen streams of lower purity since the circulation of hydrogen to the saturation zone prevents the loss of products and the high recycle rate through the dehydrogenation section sufficiently dilutes the concentration of olefins to prevent fouling of the dehydrogenation catalyst. Low severity dehydrogenation also complements the operation of the oligomerization zone by generating an effluent stream that eliminates the need for a separate recycle stream to control temperatures rises in the oligomerization catalyst bed.

The process can also be arranged such that a serial flow of the primary process streams passes through the three primary processing steps with only one primary separation column. This result is obtained by the addition of the isobutane containing input stream to a deisobutanizer and the supplemental additional of mixed light olefins between the dehydrogenation and oligomerization steps. Very few additional secondary separation steps are needed only to remove heavies or uncondensibles.

Other objects, embodiments and details of this invention will be provided in the following detailed disclosure of the invention.

DETAILED DESCRIPTION OF THE INVENTION

Figure 1:
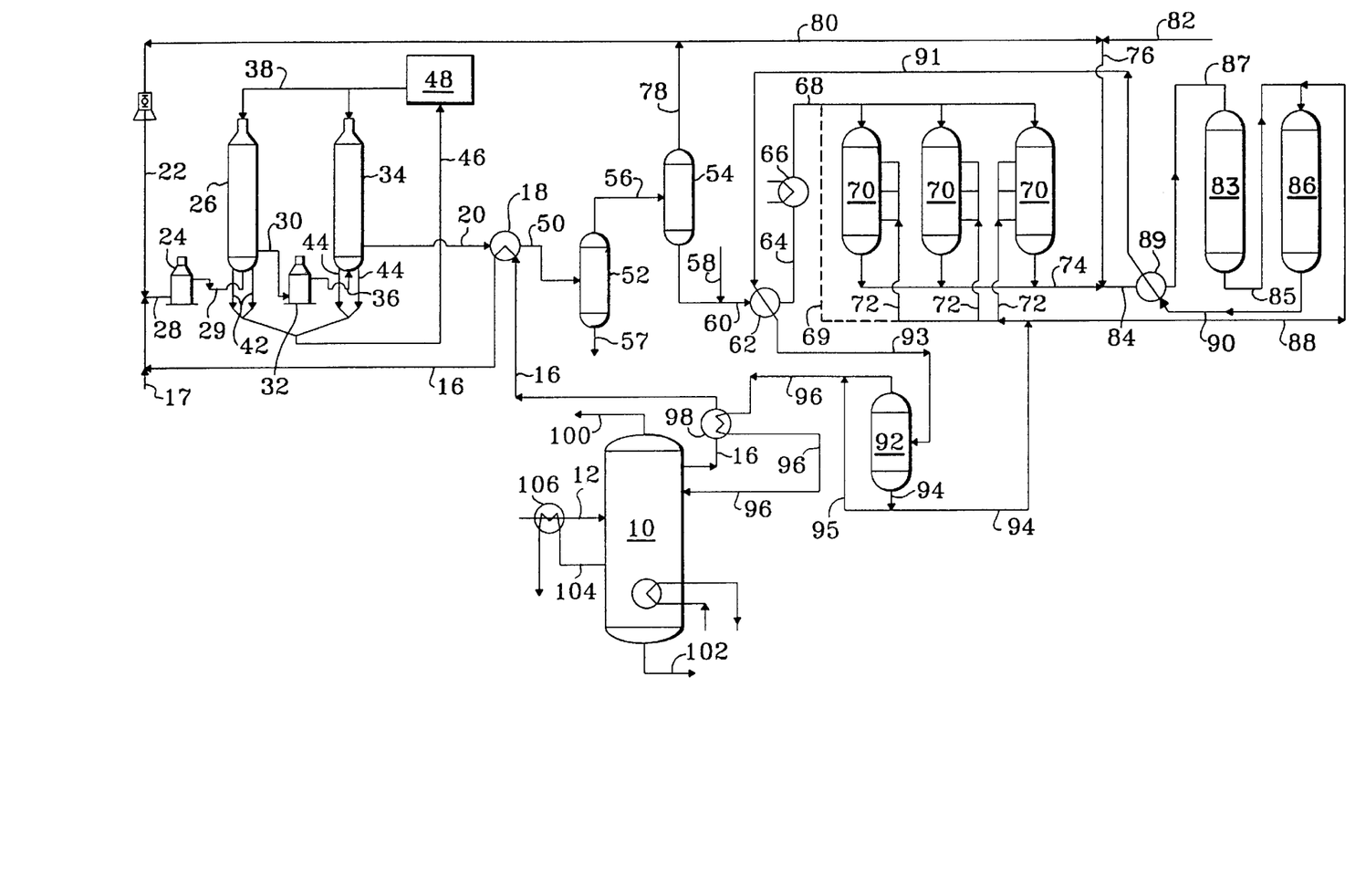
The FIGURE is a schematic process flow diagram of the invention showing principal processing zones, heat exchange and processing steps.

The process and different operational steps will be described in conjunction with the figure. The figure shows only one form of the invention and only those portions of the process that are necessary to gain an understanding of the invention and the necessary means of integrating the different process steps that comprise the invention. Further details related to valves, control means, pumps, compressors, coolers, and other necessary processing equipment are well known to those skilled in the art and not described in detail unless necessary for an understanding of the invention.

The primary feed to the process unit enters a deisobutanizer column 10 via a line 12. Direct entry of the feed into a deisobutanizer column is believed to offer the most advantageous location for the input of the primary feed, but the primary feed may enter the process at other locations. One alternate location for the primary feed would include direct entry into a dehydrogenation zone.

Line 12 typically delivers the primary feedstream to an intermediate tray level of the column 10. Column 10 also receives recycle material from a hereinafter described saturation S zone effluent stream via a line 96. Deisobutanizer column 10 provides a sidecut stream 16 that comprises feedstream isobutane.

Line 16 passes the dehydrogenation zone feed through exchanger 98. Heating continues as line 16 first passes the dehydrogenation zone feed through exchanger 18 to recover heat from the dehydrogenation zone effluent 20. Depending on the composition of the dehydrogenation catalyst a small amount of sulfur may be added via line 17 to prevent carbon formation on metallic surfaces of the reactors and heaters and to passivate the catalyst. Line 22 combines the dehydrogenation zone feedstream with a hydrogen-containing stream to produce a combined feedstream that passes via line 28 through charge heater 24 and into a dehydrogenation reactor 26. Contact with a dehydrogenation catalyst dehydrogenates a portion of the paraffin components from the feedstream which pass out of dehydrogenation zone reactor 26 via a line 30 and through an inter-heater 32 to provide heat of reaction for further conversion of isobutane in a second reactor 34. Line 36 carries the heated and partially converted dehydrogenation zone feed through reactor 34 and out of the reactor through effluent stream 20.

The figure schematically shows the operation of the dehydrogenation zone with a catalyst regeneration system that supplies regenerated catalyst to reactors 26 and 34 via line 38. A catalyst transfer system (not shown) transfers coked catalyst from the bottoms of reactor 26 and 34 via conduits 42 and 44 respectively and into a catalyst lift conduit 46. Conduit 46 delivers the coked catalyst to a regeneration section 48. Catalyst regeneration section 48 reconditions catalyst by coke combustion.

The effluent from the dehydrogenation reaction zone contains at least hydrogen, butane, butenes, some light hydrocarbons and small amounts of heavy hydrocarbons comprising mainly xylenes and aromatics. Line 20 passes the effluent from the dehydrogenation reaction zone through exchanger 18 and into a separator 52 to remove the various heavy hydrocarbon components from the effluent stream via line 57. A line 56 carries the vapor effluent from heavies separator 52 to a hydrogen separator 54 for the recovery of a hydrogen-containing stream that recycles hydrogen to the dehydrogenation zone feed via line 22. The dehydrogenation zone of this invention may operate with a relatively impure hydrogen stream. A suitable hydrogen recycle stream for this invention may have a hydrogen concentration of less than 90 wt %. Acceptable hydrogen concentrations may be as low as 70 wt % and more typically about 80 wt % with the remainder of the hydrogen-containing stream comprising $C_3$–$C_3$ hydrocarbons and typically additional smaller concentrations of $C_4$ hydrocarbons. The purity of the hydrogen stream to the dehydrogenation zone may be increased if desired by chilling the overhead from separator 54 to decrease the carry over of impurities into stream 22. The remainder of the hydrogen-containing stream recovered from separator 54 serves as a hydrogen feed to the saturation reactor as hereinafter described.

The bottom stream from separator 54 is combined with an olefin-containing stream 58 to provide a combined feed to the oligomerization reaction zone. The olefin-containing stream carried by line 58 comprises a second input stream that supplies additional olefins to the oligomerization reaction zone. The olefins entering through line 58 will include normal butenes and isobutene and may also include $C_3$ and $C_5$ olefins as well some paraffins.

A line 60 carries the combined oligomerization zone feedstream through an exchanger 62 to heat the oligomerization feed against the saturation zone effluent. Line 64 carries the heated oligomerization feed through a trim heater 66 and to the reactors via a line 68. In addition to the olefin feed a heavy recycle stream comprising $C_8$ and heavier paraffins may be combined with the feed to the oligomerization zone via line 69. Oligomerization feed passes serially through a series of oligomerization reactors 70 which are divided into multiple stages. A distribution system supplies quench to each stage via quench distribution lines 72. Effluent piping 74, connected to the outlet of the oligomerization reactor 70, recovers an oligomerization effluent stream.

A line 76 supplies hydrogen to the effluent from the oligomerization reaction zone to produce a combined feed for the saturation reaction zone. Line 76 receives hydrogen from the dehydrogenation process via lines 78 and 80. Any outside make-up hydrogen enters the process via a line 82. Preferably all of the effluent from the oligomerization zone passes, together with the added hydrogen, directly into a saturation zone.

The saturation zone saturates the unsaturated gasoline boiling range components from the oligomerization zone to provide an alkylate quality product stream. The saturation zone will typically use a plurality of reactors 83, 86 arranged in series with feed passing through each reactor. The series reactor arrangement permits greater control of temperatures.

Line 84 carries the combined feed in indirect heat exchange against the effluent from the saturation zone in exchanger 89 and the heated saturation zone feed flows via a line 87 into the first saturation reactor 83. The preferred arrangement of the hydrogenation zone will be a two stage hydrotreating reactor system wherein the effluent from the first saturation reactor 82 passes via a line a 85 into second reaction zone 86. To control the temperature exotherm from the first reaction zone a portion of the process quench stream passes via line 88 into combination with the first reaction zone effluent 85. The now saturated oligomerization reaction zone effluent passes via line 90 through heat exchanger 89 and via a line 91 to heat exchanger 62 to recover heat from the saturation reaction before entering a quench separator 92 via a line 93.

Quench separator 92 recovers saturated heavy material from the saturation zone to provide a liquid stream for intermediate quench in the saturation zone and the flushing of heavy hydrocarbons from the surface of the oligomerization catalyst. The bottom stream 94 from separator 92 supplies the quench material to the oligomerization and the saturation reaction zones. The bottoms stream 94 can also supply any portion of the heavy saturated product that is recycled to the inlet of the oligomerization zone via line 69. A portion of the quench stream may be returned to the separator overhead via line 95 for withdrawal from the process with bottoms product from the deisobutanizer 10. The overhead material from separator 92 and any additional separator bottoms taken by line 95 are taken by line 96 and contain primarily alkylate quality product and unreacted butanes. Additional heat recovery from the separator stream 96 takes place in exchanger 98 to initially raise the temperature of the dehydrogenation zone input stream from deisobutanizer 10.

The preferred arrangement of deisobutanizer 10 performs a simultaneous distillation of the product containing separator overhead stream along with the initial refinery $C_4$ input stream. This highly efficient arrangement of the process with the preferred deisobutanizer vessel separates off the light ends as an overhead stream 100 while simultaneously supplying the previously described dehydrogenation zone input stream 16 as a sidecut. The primary fractionator also delivers the saturated oligomerization zone product components as a bottom stream 102. The highly integrated deisobutanizer of this preferred arrangement may also supply a normal $C_4$ sidecut stream to withdraw excess unreacted butanes from the process. The sidecut is withdrawn via a line 104 which may supply additional heat by indirect heat exchange with the $C_4$ input stream in a heat exchanger 106.

The successful integration of this invention relies on the addition of an isobutane containing feed and a separate light olefin feed at different locations of the process. The primary feed will typically comprise a refinery paraffin stream that contains at least 20 wt % isobutane. Preferred feeds are rich in $C_4$ paraffins and contain a high percentage of isobutane. (The term rich when used herein means a stream having a weight or volume percent content of at least 50% of the mentioned component while the term relatively rich means a stream having a higher concentration of the mentioned component than the feed from which it was derived.) Preferred feeds for this process are rich in isobutane and will more preferably have an isobutane concentration in a range of from 55 to 99 wt %. Typical sources for this feedstream are field butanes, refinery C4 saturate streams, effluents from butane isomerization, and butanes from gas recovery units. The isobutane stream can be obtained from refinery butane streams or other sources that will provide a butane rich feed.

The preferred deisobutanizer arrangement of this process facilitates the use of relatively impure isobutane containing streams. To a substantial degree, the primary fractionator prefractionates higher and lower boiling hydrocarbons from the dehydrogenation zone feed in the primary fractionator. Thus, feeds containing isobutane with substantial quantities of other hydrocarbons can still provide acceptable feed sources.

The preferred arrangement of the primary fractionator is as a single deisobutanizer column. Integration of the deisobutanizer column into simultaneous feed and product separation allows the process to efficiently perform the necessary distillations for the successful operation of the process. Integration of multiple feed inputs and stream outputs on the deisobutanizer column promote separation efficiency by permitting matching of stream compositions with column locations in a manner that reduces the overall size of the deisobutanizer column. The deisobutanizer column design is arranged to provide the high concentration of the isobutanes in the feed to the dehydrogenation zone via a sidecut stream. The deisobutanizer will typically provide an isobutane purity of 80 wt % and more preferably at least 95 wt %. The column also operates to separate remaining $C_4$ minus materials from the dehydrogenation zone feedstream via overhead stream 100. The carry over of $C_3$ hydrocarbons with the dehydrogenation zone feedstream does not present a problem for the column operation. Propane carried over with the feed from the column undergoes dehydrogenation in the dehydrogenation zone with a subsequent increase in oligomerization product.

The isobutane containing feed will often contain large proportions of normal butane. The primary fractionator will normally provide an additional sidecut stream for the recovery of a normal butane containing stream. It may often be desirable to send this stream to a butane isomerization zone to obtain additional isobutane for input to the process.

The isobutane rich sidecut stream from the deisobutanizer passes to the dehydrogenation reaction zone. Suitable dehydrogenation reaction zones for this invention beneficially integrate the dehydrogenation zone with the oligomerization reaction zone by the use of high pressure and low conversion conditions. The higher pressure and lower conversion will reduce catalyst deactivation and allow most dehydrogenation reaction zones to operate with reduced regeneration requirements. In addition higher pressure conditions in particular reduce compression requirements for effluent separation and improve process efficiency. The lower severity dehydrogenation zone reaction conditions also provide the unreacted mass flow of butane for temperature control necessary for the condensation reactions.

The dehydrogenation section may use any type of reactor that will dehydrogenate the isobutane to isobutylene. Catalytic dehydrogenation is an established hydrocarbon conversion process employed in the petroleum processing industry for producing olefins from paraffinic feedstocks. The art of catalytic dehydrogenation is well known. Briefly, suitable dehydrogenation process will admix a feedstock with a stream comprising hydrogen and contact the feed with catalyst in a reaction zone. As previously stated the preferred feedstocks for catalytic dehydrogenation of this invention predominately comprise isobutane and may also contain propane and pentanes. The catalytic dehydrogenation process will treat the substantially paraffinic hydrocarbons to thereby form olefinic hydrocarbon compounds. Suitable dehydrogenation zones for this process provide a low conversion of isobutane to isobutene with a relatively low rate of catalyst fouling.

Any suitable dehydrogenation catalyst may be used in the process of the present invention. The particular dehydrogenation reactor configuration will depend on the performance characteristics of the catalyst and the reaction zone. Suitable dehydrogenation zones for this invention operate at low conversion conditions. The olefin yield from the dehydrogenation reactor will usually be in a range of 10 to 30 wt % and more typically in a range of from 15 to 20 wt %. Operating conditions within the dehydrogenation zone are also chosen to produce an olefin effluent stream having an isobutene to normal butene ratio of more than 1. Low conversion conditions within the dehydrogenation zone extends the life of the dehydrogenation catalyst. Low conversion conditions will usually give the catalyst a cycle life of at least 4 days and more typically 6 days. Any suitable method can regenerate the catalyst such as a swing bed or continuous catalyst regeneration procedures.

A catalytic dehydrogenation reaction is normally effected in the presence of catalyst particles comprised of one or more Group VIII nobel metals (e.g., platinum, iridium, rhodium, palladium) combined with a porous carrier, such as a refractory inorganic oxide. Generally, the preferred catalyst comprises a platinum group metal component, an alkali metal component with the porous carrier. The catalyst may also contain promoter metals which advantageously improve the performance of the catalyst. It is preferable that the porous carrier material of the dehydrogenation catalyst be an absorptive high surface area support having a surface area of about 25 to about 500 $m^2/g$. The porous carrier material should be relatively refractory to the conditions utilized in the reaction zone and may be chosen from those carrier materials which have traditionally been utilized in dual function hydrocarbon conversion catalysts. A porous carrier material may therefore be chosen from an activated carbon, coke or charcoal, silica or silica gel, clays and silicates including those synthetically prepared and naturally occurring, which may or may not be acid-treated as, for example, attapulgus clay, diatomaceous earth, kieselguhr, bauxite; refractory inorganic oxide such as alumina, titanium dioxide, zirconium dioxides, magnesia, silica alumina, alumina boria; crystalline alumina silicates such as naturally occurring or synthetically prepared mordenite or a combination of one or more of these materials or other zeolite materials. The preferred porous carrier material is a refractory inorganic oxide, with the best results being obtained with an alumina carrier material. Alumina is the most commonly used carrier. The preferred alumina materials are known as the gamma, eta and theta alumina with gamma and theta alumina giving the best results. The preferred catalyst will have a theta alumina carrier which is in the form of spherical particles. Particles having relatively small diameters on the order of about $\frac{1}{16}"$ are preferred, but the particles may be as large as $\frac{1}{4}"$.

Of the platinum group metals, which include palladium, rhodium, ruthenium, osmium or iridium, the use of platinum is preferred. The platinum group component may exist within the final catalyst composite as a compound such as an oxide, sulfide, halide, oxysulfide, etc., of an elemental metal or in combination with one or more other ingredients of the catalyst. It is believed that the best results are obtained when substantially all of the platinum group components exist in the elemental state. The platinum group components generally comprises from about 0.01 to about 2 wt. % of the final catalytic composite, calculated on an elemental basis. It is preferred that the platinum content of the catalyst be between about 0.2 and 1 wt %. The preferred platinum group component is platinum, with palladium being the next preferred metal. The platinum group component may be incorporated into the catalyst composite in any suitable manner such as by coprecipitation or cogelation with the preferred carrier material, or by ion-exchange or impregnation of the carrier material. The preferred method of preparing the catalyst normally involves the utilization of a water-soluble decomposable compound of a platinum group metal to impregnate the calcined carrier material. For example, the platinum group component may be added to the support by commingling the support with an aqueous solution of chloroplatinum or chloropalladic acid. An acid such as hydrogen chloride is generally added to the impregnation solution to aid in the distribution of the platinum group component throughout the carrier material.

The preferred alkali metal is normally either potassium or lithium, depending on the feed hydrocarbon. The concentration of the alkali metal may range from about 0.1 to 3.5 wt %, but is preferably between 0.2 and about 2.5 wt % calculated on an elemental basis. This component may be added to the catalyst by the methods described above as a separate step or simultaneously with the solution of another component.

As noted previously, the dehydrogenation catalyst may also contain a promoter metal. One such preferred promoter metal is tin. The tin component should constitute about 0.01 to about 1 % tin. It is preferred that the atomic ratio of tin to platinum be between 1:1 and about 6:1. The tin component may be incorporated into the catalytic composite in any suitable manner known to effectively disperse this component in a very uniform manner throughout the carrier material. A preferred method of incorporating the tin component involves coprecipitation during the preparation of the preferred carrier material. This method typically involves the addition of a suitable soluble tin compound, such as stannous or stannic chloride to an alumina hydrosol, mixing these ingredients to obtain a uniform distribution throughout the sol and then combining the hydrosol with a suitable gelling agent and dropping the resultant admixture into an oil bath. The tin component may also be added through the utilization of a soluble decomposable compound of tin to impregnate the calcined porous carrier material. A more detailed description of the preparation of the carrier material and the addition of platinum component and the tin component to the carrier material may be obtained by reference to U.S. Pat. No. 3,745,112.

The low severity operation of the preferred dehydrogenation zones will result in an extended catalyst life. Depending on the catalyst system and the properties of the dehydrogenation zone feed, the dehydrogenation reaction zone will use a solid catalyst that can operate as a fixed bed, a semi-regenerated bed or continuous catalyst regeneration. The actual arrangement of the dehydrogenation zone may be relatively simple and include a single reactor and single heater. Moreover, the dehydrogenation catalytic reaction zone may consist of multiple catalyst beds. In one such system, the catalyst is employed within an annular bed through which it is movable via gravity flow.

During the course of a dehydrogenation reaction, catalyst particles become deactivated as a result of mechanisms such as the deposition of coke on the particles; that is, after a period of time in use, the ability of catalyst particles to promote dehydrogenation reactions decreases to the point that the catalyst is no longer useful. The catalyst must be reconditioned, or regenerated, before it can be reused in a dehydrogenation process.

In such systems, it is common practice to remove catalyst from the bottom of the reaction zone, regenerate it and then return it to the top of the reaction zone. Preferred methods of dehydrogenating light hydrocarbons, suitable for the continuous dehydrogenation of isobutane using a continuous catalyst regeneration system are described in U.S. Pat. Nos. 5,227,566, 3,978,150, 3,856,662, 3,854,887, 3,839,197, 3,825,116, and 3,706,536 the contents of which are hereby incorporated by reference.

In preferred form, the dehydrogenation process will employ a moving bed reaction zone and regeneration zone. Moving bed systems advantageously maintain production while the catalyst is removed or replaced. In a typical moving bed reaction zone fresh catalyst particles are fed through the reaction zones by gravity. Catalyst is withdrawn from the bottom of the reaction zone and transported to a regeneration zone where a hereinafter described multi-step regeneration process is used to recondition the catalyst to restore its full reaction promoting ability. Catalyst flows by gravity through the various regeneration steps and then is withdrawn from the regeneration zone and furnished to the reaction zone. Movement of catalyst through the zones is often referred to as continuous though, in practice, it is semi-continuous. By semicontinuous movement is meant the repeated transfer of relatively small amounts of catalyst at closely spaced points in time. For example, one batch per minute may be withdrawn from the bottom of a reaction zone and withdrawal may take one-half minute, that is, catalyst will flow for one-half minute. If the inventory in the reaction zone is large, the catalyst bed may be considered to be continuously moving.

In the preferred regeneration method for the dehydrogenation process of this invention, catalyst is contacted with a hot oxygen-containing gas stream (known as recycle gas) in order to remove coke which accumulates on surfaces of the catalyst while it is in a dehydrogenation reaction zone. Coke is comprised primarily of carbon but it also comprised of a relatively small quantity of hydrogen. The mechanism of coke removal is oxidation to carbon monoxide, carbon dioxide, and water. Coke content of spent catalyst may be as much as 20% of the catalyst weight, but 5–7% is a more typical amount. Within the combustion zone, coke is usually oxidized at temperatures ranging from about 850° F. (471° C.) to about 1000° F. (538° C.), but temperatures in localized regions may reach 1100° F. (593° C.) or more.

Oxygen for the combustion of coke typically enters what is called a combustion section of the regeneration zone in what has been termed a recycle gas. The recycle gas contains a low concentration of oxygen usually on the order of 0.5 to 1.5% by volume. The remainder of the recycle gas is usually composed of mainly of inert combustion by-products. A system of blowers, heaters and coolers maintain circulation and the temperature of the recycle gas in a recycle loop. A small quantity of the recycle gas stream is vented and replaced with a make-up stream of air or other oxygen containing gas to maintain the dilute oxygen concentration in the recycle gas stream. The low oxygen level is maintained for temperature control.

It is also possible to use steam as a diluent for the combustion gas stream and avoid the circulation of recycle gas. The low severity conversion conditions within the dehydrogenation zone result in a low coke load on the regeneration zone. The low coke loading requires only a small regeneration zone to provide sufficient coke combustion. Relatively small amounts of steam can be used to dilute an oxygen containing stream to sufficiently low $O_2$ levels for a controlled heat release in the regeneration zone. Instead of air, a relatively pure oxygen stream may be preferred for admixture with the steam. The use of the preferred theta alumina catalyst will also provide the necessary resistance to hydrothermal deactivation of the catalyst for repeated regenerations with the steam diluent.

In addition to combustion the regeneration normally includes steps of drying and redispersion. The catalyst particles can pass directly from the combustion zone directly into a drying zone where the water that is left on the catalyst particles after the combustion process is removed. Water is evaporated from the surface and pores of the catalyst particles by contact with a heated gas stream. Exposure to reactants in a wet reduction zone and the exposure to high temperatures and steam in the combustion zone serves to agglomerate the platinum on the surface of the catalyst. Once the coke has been removed and the catalyst particles are in various states of oxidation, contact of the catalyst at a temperature between about 800° F. (426° C.) and 1100° F. (593° C.) in a chlorine environment will re-disperse the platinum over the surface of the catalyst support. The arrangement of a typical combustion, drying and redispersion sections may be seen in U.S. Pat. Nos. 3,653,231 and 5,227,566 the contents of which are hereby incorporated by reference.

Operating conditions for the dehydrogenation reaction zone are specifically selected to provide low conversion. Operating conditions for the preferred dehydrogenation zone of this invention will usually include an operating temperature in the range of from 950° to 120° F. with an operating temperature of at least 1100° F. being preferred and with an operating temperature of about 1130° F. being particularly preferred. A relatively high operating pressure characterizes the low conversion conditions of the preferred dehydrogenation zone and is usually within a range of 30 to 150 psig. Pressures for the preferred dehydrogenation zone are more typically at least 50 psig with pressures of about 70 to 110 psig being particularly preferred. Low conversion conditions will also permit the operation of the dehydrogenation zone at low hydrogen to hydrocarbon ratios in a range of from 0.1 to 4 and more preferably about 0.2. Space velocities for the dehydrogenation zone range from 0.5 to 50 and will normally exceed 10 and typically equal about 15. Further extension of the catalyst life from the typical 4 to 6 days may be obtained by operating with lower space velocities.

Most typical multireactor arrangements for the dehydrogenation zone will have interstage heating between reactors that establish adiabatic conditions through the reactors. Further improvements in catalyst life and reactor stability may be obtained by operating the reactor isothermally or with an ascending temperature profile over the reactant path of the reactor. Isothermal conditions or ascending temperature profiles may be established by indirect heat exchange between the reactants or catalyst beds within the reaction zone and a circulating heat exchange medium. Such reactor arrangements can include internal heating means within the catalyst bed. Useful arrangements for internal heating of reactants can employ tubes or channels for indirect heating with catalyst and reactants on one side of a heat exchange surface and a heating medium on the opposite side. Other heating arrangements for the reactor bed may integrate a fired heater wherein catalyst is contained within tubes that occupy the combustion chamber of heater.

Low conversion and lower temperatures for the dehydrogenation reaction zone also promote savings in equipment. For example a reciprocating compressor may be used in the recovery of recycle of hydrogen from dehydrogenation effluent. Higher pressures within the dehydrogenation zone and its integration with the saturation reaction zone also reduces the equipment expense associated with hydrogen supply and recovery. The relatively high pressures within the dehydrogenation zone can result in the recovery of a hydrogen stream having purities of 80% or greater with minimal cooling. The low conversion operation of the dehydrogenation zone allows utilization of such a low purity hydrogen stream due to the high amount of isobutane recycle that dilutes the harmful effect of any olefin carryover to the dehydrogenation zone. In addition, the supply of the excess hydrogen from the dehydrogenation zone to the saturation zone results in the recovery of excess $IC_4$ material in the primary fractionator which would otherwise pose an unacceptable loss of these hydrocarbons in the operation of the process.

The effluent from the dehydrogenation will normally undergo recovery of hydrogen and removal of aromatics that are produced as the by-products from the preferred dehydrogenation process. Apart from heat exchange and pressurization all remaining portions of the dehydrogenation zone effluent will pass directly to the oligomerization zone.

The addition of an olefin feed downstream of the dehydrogenation zone separator is also a key to the efficient and advantageous performance of this process. The source of the olefin input stream is typically a light gas stream recovered from the gas separation section of an FCC process. Other sources for suitable olefin feeds will also include $C_4$ streams from steam cracking and coker off gas. The olefin feed stream is characterized by having an overall $C_4$ olefin concentration of at least 10 wt %. In most operations, this olefin feed stream will contain $C_4$ olefins but it may also constitute all or substantial quantities of $C_3$ olefins. Typically the olefin feeds can have a $C_3$ to $C_5$ olefin concentration of at least 30 wt %. Preferred feeds will have a $C_4$ olefin concentration of at least 30 wt % and more preferably at least 50 wt % Preferably the olefin feed stream will comprise at least 20 wt % and more preferably 30 wt % isobutene. The isobutene will preferably comprise at least 33 % of the total butenes. The olefin content of preferred feeds will predominately comprise branched olefins with isobutene present in large quantities. The reaction of normal pentenes and propylene is promoted by maintaining a high concentration of isobutene in the feed to the oligomerization zone of this invention. Oligomerization of pentene and propylene into high octane isomers is promoted by having an olefin distribution in the feed to the oligomerization zone that comprises at least 50 wt % isobutene. When large quantities of propylene are present in the feed to the oligomerization zone, the octane number of the product may be increased by raising the percentage of isobutene in the butene fraction of the feed. Preferably the butene fraction will comprise 65% isobutene when large amounts of propylene enter the oligomerization zone.

Suitable oligomerization zones for this invention take on many forms. The oligomerization process is known by many names such as catalytic condensation and also catalytic polymerization. Known catalysts for effecting such reactions include heterogenous catalysts such as Y zeolites, beta zeolites, silicalite, and sulfonated resins as well as homogenous catalysts such as borontrifluoride as described in U.S. Pats. No. 3,906,053, 3,916,019 and 3,981,941.

The preferred catalyst for the oligomerization process is a solid phosphoric acid (SPA) catalyst. The SPA catalyst as previously mentioned refers to a solid catalyst that contains as a principal ingredient an acid of phosphorous such as ortho -pyro- or tetraphosphoric acid. The catalyst is normally formed by mixing the acid of phosphorous with a siliceous solid carrier to form a wet paste. This paste may be calcined and then crushed to yield catalyst particles where the paste may be extruded or pelleted prior to calcining to produce more uniform catalyst particles. The carrier is preferably a naturally occurring porous silica-containing material such as kieselguhr, kaolin, infusorial earth, and diatomaceous earth. A minor amount of various additives such as mineral talc, fuller's earth, and iron compounds including iron oxide may be added to the carrier to increase its strength and hardness. The combination of the carrier and the additives preferably comprises about 15–30% of the catalyst, with the remainder being the phosphoric acid. The additive may comprise about 3–20% of the total carrier material. Variations from this such as a lower phosphoric acid content are however possible. Further details as to the composition and production of SPA catalysts may be obtained from U.S. Pat. Nos. 3,050,472; 3,050,473, and 3,132,109 and from other references.

Oligomerization zones in general are maintained at conditions which may vary widely due to the previously listed variables. In this invention the oligomerization reaction zone is operated at temperatures and pressures that increase compatibility with the dehydrogenation reaction zone effluent and the feed of the oligomerization reaction zone to the saturation reaction zone. A broad range of suitable pressures is from about 15 psig to about 1200 psig. The recycle of $C_8$ and heavier paraffins from the saturation zone has been found in some cases to improve the selectivity of oligomerization reaction zone to $C_8$ olefin production.

In the preferred embodiment, an SPA catalyst is utilized in a chamber-type reactor to form an effluent containing $C_8$ through $C_{12}$ hydrocarbons having boiling points within a gasoline boiling point range of about 100° F. to about 450° F. as determined by the appropriate ASTM distillation method. The preferred temperature of the oligomerization reaction zone will typically be in a range of from 200° to 500° F. and will more typically be in a range of from 300° to 450° F. Pressures within the oligomerization reaction zone will usually be in a range of from 200, to 1200 psig and more typically in a range of from 200 to 600 psig. Steam or water may be fed into the reactor to maintain the desired water content in the preferred catalyst.

The catalyst is preferably disposed in fixed beds within the oligomerization zone in what is known as a chamber-type reactor structure. In a chamber-type reactor, the reactants flow through a series of large diameter catalyst beds. The temperature of the reactants is controlled by recycling relatively inert hydrocarbons which act as a heat sink. The unreacted isobutane from the dehydrogenation zone supplies a large proportion of the inert hydrocarbons that act as the heat sink. Temperature control within the oligomerization reaction zone is also promoted by the use of a quench material. A quench material that comprises the inert materials and heavy product material from the saturation zone may be used simultaneously for temperature control. The quench material serves as its primary advantage of the control of temperatures within the oligomerization reaction zone. As a secondary purpose, the quench material can provide a flushing function to inhibit the development of coke and the deactivation of coke in the deactivation of the catalyst within the reaction zones. As pressure within the oligomerization reaction zone decreases the flushing function of the quench material decreases as the vaporization of the reactants and quench within the reaction zone increase. The use of higher molecular weight quench material within the oligomerization reaction zones to inhibit coking while permitting lower pressure operation is one possible method for the operation of this invention. Thus, the addition of heavier quench materials facilitates the operation of the oligomerization zone at higher temperatures and lower pressures while still flushing the catalyst and preventing coke production. The recycle of higher molecular weight paraffins, such as $C_8$ and heavier hydrocarbons from the saturation effluent, can also improve selectivity of the oligomerization zone to produce the desired $C_7$+ olefin products. Since the higher molecular weight materials have benefits beyond use as a quench, it can be beneficial to add all or a portion of such material to the inlet of oligomerization reactor with the feed.

The different catalyst beds are preferably contained within one or more cylindrical, vertically oriented vessels and the feed stream preferably enters the top of the reactor. Typically, a chamber-type reactor will contain about five catalyst beds.

With the addition of the olefin input stream the combined feed to the oligomerization zone will preferably have a ratio of paraffins to olefins of from 1:1 to 5:1. Typically the paraffin concentration of the feed to the oligomerization reaction zone will be at least 50 wt % and more typically at least 70 wt %. A high percentage of the olefins in the feed stream entering the process as the secondary feed stream upstream are reacted in the oligomerization reaction zone along with the isobutene with olefin conversions in the range of from 80 to 99%. The principal oligomerization products comprise $C_7$+ olefins.

The oligomerization effluent containing principally isobutane and the olefinic gasoline components passes to the saturation reactor. Suitable saturation reactors will provide an essentially complete saturation of all olefins from saturation reactor. The effluent from the oligomerization zone will preferably pass directly to the saturation zone without separation or recovery of light ends. Lower pressure operation for the oligomerization reactor is preferred to allow direct passage of the polymerization effluent to the hydrogenation reactor. The saturation zone will typically operate at higher temperatures than the oligomerization zone so that quench fluid and paraffins in the effluent from the oligomerization will provide additional heat sink material for the higher operating temperatures of the saturation reaction zone.

Before entering the saturation zone the oligomerization effluent is first mixed with a hydrogen containing gas stream. The gas stream should contain at least 50 wt % of hydrogen. Preferably, the hydrogen containing gas stream will have a hydrogen concentration greater than 75% wt % hydrogen. Hydrogen recovered from the dehydrogenation section supplies a major amount of the hydrogen input for the saturation zone with the remainder of the necessary hydrogen supplied from outside sources as a make-up hydrogen. High purity is preferred for the make-up hydrogen to increase the overall purity of the hydrogen entering the saturation zone thereby reducing the volume of light hydrocarbons. These light hydrocarbons are undesirable since their presence needlessly increases the mass volume through the saturation reaction zone and their relatively high vapor pressure can increase the loss of isobutane in the deisobutanizer column.

The make-up gas stream is mixed with the oligomerization effluent in proportions that will produce a hydrogen to hydrocarbon ratio in a range of 0.1 to 2.0 and more preferably in a range of from 0.15 to 0.30. Preferably the saturation zone of this invention will comprise a hydrotreater section that requires a hydrogen to hydrocarbon ratio of not more than 0.9 stdm$^3$/m$^3$ (50 SCFB) at the effluent of the saturation reactor.

The preferred saturation reactor of this invention will provide an essentially complete saturation of all unsaturated hydrocarbons. Conditions within the hydrotreating zone typically include a temperature in the range of 200°–600° F., a pressure of from 100 to 1000 psig and a liquid hourly space velocity of from 1 to 20. Preferably, the reaction conditions are selected to keep the hydrocarbon feed in a vapor phase. The hydrotreater arrangement will generally operate at temperatures that permit the raising of the combined feed stream to reaction temperatures by heat exchange with hydrotreater effluent. In this manner any heat importation into the oligomerization and hydrogenation sequence can preferably be made by a trim heater on the inlet stream to the oligomerization reaction zone.

The preferred hydrotreatment reactor contains a fixed bed of hydrotreatment catalyst. Catalytic composites that can be used in this process include traditional hydrotreating catalysts. Combinations of clay and alumina-containing metallic elements from from Group VIII alone and from both Group VIII and Group VIB of the Periodic Table have been found to be particularly useful. Group VIII elements include iron, cobalt, nickel, ruthenium, rhenium, palladium, osmium, indium and platinum with cobalt and nickel being particularly preferred. The Group VIB metals consist of chromium, molybdenum and tungsten, with molybdenum and tungsten being particularly preferred. The metallic components are supported on a porous carrier materials. The carrier material may comprise alumina, clay or silica. Particularly useful catalysts are those containing a combination of cobalt or nickel metals ranging from 2.0 to 5 wt % and from 5 to 15 wt % molybdenum on an alumina support. The weight percentages of the metals are calculated as though they existed in the metallic state. Typical commercial catalysts comprise spherical or extruded alumina based composites impregnated with Co—Mo or Ni—Mo in the proportions suggested above. Other useful catalyst compositions 15 to 20 wt. % nickel on alumina. The ABD of commercial catalysts generally range from 0.5 to 0.9 g/cc with surface areas ranging from 150 to 250 m$^2$/g. Generally, the higher the metals content on the catalyst, the more active the catalyst.

Effluent from the saturation reaction zone enters a quench separator. The quench separator divides a high proportion of the $C_4$ and lower boiling materials from the saturation zone effluent to provide a quench stream with a relatively higher concentration of $C_7$ and heavier hydrocarbons. The recovery of the higher molecular weight material from the effluent of the saturation reaction zone benefits the integration of the oligomerization reaction zone and the saturation reaction zone. The recycle of the $C_7$ and heavier hydrocarbons provides a nonreactive stream that permits a liquid concentration to be maintained in the oligomerization reaction zone at lower pressures. Lowering of the pressure in the oligomerization reaction zone reduces the cost or compression between typical saturation reaction zones and the dehydrogenation zone while providing the necessary wash to keep the oligomerization zone catalyst clean. Except for any volume that recirculates as quench all of the remaining effluent from the saturation reaction zone will preferably enter the primary separation column to complete the flow scheme of the invention as described.

EXAMPLE

To more fully demonstrate the attendant advantages of the present invention, the following example is based on thermodynamic analysis and engineering calculations. The example presents the operation of the invention as depicted in the Figure and reference numbers used in this example refer to these Figure. As with the Figure details such as miscellaneous pumps, heaters, coolers, valving, start-up lines and similar hardware have been omitted as being non-essential to a clear understanding of the techniques involved.

A feed input stream containing 28.5 mol % isobutane and 69 mol % normal butane enters the process via line 12. Other lesser components of the input stream include 0.26% propane, 0.6 mol % butene, and 1.5% isopentane. The feed input stream enters the deisobutanizer column 10 at a temperature of 190° F. and a pressure of 205 psi. The deisobutanizer column also receives a recycle stream 96 containing products and having the composition given in the table. The recycle stream 96 enters the column at a temperature of 185° F. and a pressure of 205 psi. The isobutane feedstream for the dehydrogenation zone is combined with the sulfur from line 17 to produce a concentration of 25 ppm sulfur in the feed. Hydrogen for the dehydrogenation zone is supplied by line 22 which has a hydrogen purity of 82 mol % with the remainder of the gas stream comprising about 4% methane, 10% isobutane, and 2% isobutene. The feed input stream is combined with the stream of line 22 and heated to produce a combined feed input stream having the concentration given in the table for line 29. The combined feedstream enters the dehydrogenation zone at a temperature of about 1120° F. and a pressure of 137 psi. The feedstream passes through two stages of dehydrogenation where it contacts a dehydrogenation zone catalyst comprising 0.6 wt % platinum, 0.3 wt % tin, 0.70 wt % potassium and 0.1% Cl on a theta alumina base. The combined feed passes through the dehydrogenation zone at a LHSV of 15. After heat exchange with the incoming feed, a small side stream of heavy hydrocarbons is withdrawn in separator 52. The heavy hydrocarbon stream contains about 2 mol % aromatic hydrocarbons with the remainder of the stream consisting mainly of $C_4$ hydrocarbons.

| Stream Mole % | 29 | 58 | 68 | 87 | 94 | 96 | 102 |
|---|---|---|---|---|---|---|---|
| $H_2$ | 17.0 | 0.00 | .4 | 13.6 | .3 | 2.6 | 0.00 |
| $C_1$ | .8 | 0.00 | .2 | .8 | .2 | 1.1 | 0.00 |
| $C_2$ | .1 | 0.00 | .1 | .3 | .2 | .3 | 0.00 |
| $C_3$ | 1.4 | .1 | 1.6 | 1.7 | 1.4 | 2.1 | 0.00 |
| $C_3=$ | trace | .1 | 1.5 | trace | 0.00 | 0.00 | 0.00 |
| $IC_4$ | 76.4 | 39.2 | 63.0 | 60.8 | 61.3 | 70.8 | 0.00 |
| $IC_4=$ | .4 | 12.6 | 16.1 | 5.7 | 0.00 | 0.00 | 0.00 |
| $NC_4$ | 4.0 | 6.1 | 4.8 | 4.8 | 6.1 | 6.5 | 10.7 |
| $1\text{-}NC_4=$ | .1 | 8.7 | 2.8 | 2.8 | 0.00 | 0.00 | 0.00 |
| $C2\text{-}NC_4=$ | 0.00 | 6.7 | 2.2 | 2.2 | 0.00 | 0.00 | 0.00 |
| $T2\text{-}NC_4=$ | 0.00 | 10.0 | 3.3 | 3.3 | 0.00 | 0.00 | 0.00 |
| 1,2BD | 0.00 | .3 | .1 | .1 | 0.00 | 0.00 | 0.00 |
| $NC_5$ | 0.00 | 1.1 | .3 | .4 | 1.1 | .9 | 4.4 |
| $IC_5$ | trace | 8.4 | .3 | 2.7 | 4.1 | 3.4 | 15.9 |
| $1\text{-}NC_5=$ | 0.00 | 7.2 | .2 | .1 | 0.00 | 0.00 | 0.00 |
| $C2\text{-}NC_5=$ | 0.00 | .8 | .2 | .1 | 0.00 | 0.00 | 0.00 |
| $T2\text{-}NC_5=$ | 0.00 | 1.5 | .5 | .2 | 0.00 | 0.00 | 0.00 |
| $IC_5=$ | 0.00 | 3.30 | 1.10 | .4 | 0.00 | 0.00 | 0.00 |
| $C_5==$ | 0.00 | .1 | trace | trace | 0.00 | 0.00 | 0.00 |
| $C_6$ | 0.00 | .2 | .1 | .1 | .1 | .1 | 0.00 |
| $C_7=$ | 0.00 | 0.00 | 0.00 | .1 | 0.00 | 0.00 | 0.00 |
| $C_7$ | 0.00 | 0.00 | 0.00 | trace | .2 | .1 | 0.00 |
| $C_8=$ | 0.00 | 0.00 | 0.00 | 7.1 | 0.00 | 0.00 | 0.00 |
| $C_8$ | 0.00 | 0.00 | 0.00 | 2.3 | 18.1 | 9.4 | 52.5 |
| $C_9=$ | 0.00 | 0.00 | 0.00 | trace | 0.00 | 0.00 | 0.00 |
| $C_9$ | 0.00 | 0.00 | 0.00 | 0.00 | trace | trace | 0.00 |
| $C_{10}=$ | 0.00 | 0.00 | 0.00 | .4 | 0.00 | 0.00 | 0.00 |
| $C_{10}$ | 0.00 | 0.00 | 0.00 | .2 | 1.3 | .5 | 2.9 |
| $IC_5$ | 0.00 | 4.30 | 1.5 | .5 | 0.00 | 0.00 | 0.00 |
| $C_5==$ | 0.00 | .1 | trace | trace | 0.00 | 0.00 | 0.00 |
| $C_{12}=$ | 0.00 | 0.00 | 0.00 | 1.6 | 0.00 | 0.00 | 0.00 |
| $C_{12}$ | 0.00 | 0.00 | 0.00 | 7.1 | 5.5 | 2.1 | 11.9 |
| PX | 0.00 | 0.00 | trace | trace | trace | trace | 0.00 |
| TOL | 0.00 | 0.00 | 0.00 | trace | trace | 0.00 | 0.00 |

After separation of hydrogen from the dehydrogenation zone effluent, the remainder of the stream is combined with an olefin feed having the composition given in the table for line 58. The combined isobutene and olefin feed enters the oligomerization reactors at a temperature of 400° F. and a pressure of 533 psi. The oligomerization zone feed has a composition given in the table for line 68.

Aliquot portions of the oligomerization zone feed stream pass in parallel through oligomerization reactors containing an SPA catalyst. The feed fractions contact the catalyst at an LHSV of 2. Temperature rise in the oligomerization zone reactions zone is minimized by the high concentration of unreactive isobutane as well as the staged addition of quench medium to the reaction zones. The quench stream, as its main components, comprises 62% isobutane and 18% $C_8$ hydrocarbons.

Following the addition hydrogen the oligomerized hydrocarbons pass to the hydrogenation zone. The hydrogen addition comprises roughly equal quantities 82% purity hydrogen stream from the dehydrogenation zone separator and 85% purity hydrogen make-up that enters the process via line 82. The feed to the hydrogenation zone reactors has the composition given in the table for line 87 and, after heat exchange with the effluent stream, enters the saturation zone at temperature of about 530° F. and a pressure of 485 psi. The saturation zone consists of two serial hydrotreating reactors that contact the feed with a saturation catalyst comprising 15 to 20 wt % nickel on an alumina base at a space LHSV of about 10. An amount of the previously described quench equal to about 15% of the mass flow into the hydrotreating reactors is intermixed with the intermediary effluent between the hydrotreating reaction zones. After separation for recovery of quench materials, the effluent from the hydrotreating reactors has the composition given in the table for line 96 and reenters the deisobutanizer as the recycle stream after heat exchange with the dehydrogenation zone feed stream.

The deisobutanizer operates to discharge about 7000 lbs/hr of net overhead comprising about 33% isobutane, 12% propane, and 54% $C_2$ and lighter gases. The bottoms from the deisobutanizer produces a gasoline boiling range product with alkylate quality having the composition given in the table for line 102. The $C_8$ fraction recovered from line 102 is primarily high octane isopentanes that have predicted octane values of 94.1 research and 90.4 motor. Limiting the amylene concentration in the feed would produce yet higher octane values.

As the example demonstrates, the highly efficient arrangement of this process produces gasoline similar to that produced by HF alkylation processes.

What is claimed is:

1. A process for the production of a motor fuel product from a first isobutane containing input stream and a second olefin-rich input stream, said process comprising:

a) passing at least a portion of said first input stream comprising isobutane and a fraction of a saturation zone effluent stream comprising C4 hydrocarbons to a dehydrogenation zone and contacting C4 hydrocarbons in said dehydrogenation zone with a dehydrogenation catalyst at dehydrogenation conditions including a temperature of 950° to 1200° F. and a pressure of 30 to 150 psig and an LHSV of 0.5–50 and recovering hydrogen and a dehydrogenation effluent comprising C4 isoolefins with a total olefin concentration of less than 35 wt % and at least 50 wt % isobutane;

b) passing at least a portion of said dehydrogenation zone effluent and a second input stream comprising at least 20 wt % normal butenes to an oligomerization zone to supply an oligomerization zone feed having an isobutene to normal olefin ratio of at least 0.35 and contacting said oligomerization zone feed with a solid oligomerization catalyst at oligomerization conditions including a temperature of 200° to 500° F., a pressure of 100 to 1500 psig, and an LHSV of 0.8 to 5 to recover an oligomerization effluent comprising C7 and higher isoolefins;

c) passing at least a portion of the effluent from the oligomerization zone into a saturation zone and passing hydrogen recovered from said dehydrogenation zone into said saturation zone and contacting said oligomerization zone effluent and hydrogen with a saturation catalyst at saturation conditions to saturate olefins in said oligomerization effluent and recovering a saturation zone effluent stream;

d) passing at least a portion of said saturation zone effluent stream to a separation zone; and e) recovering a stream comprising said motor fuel product from said separation zone.

2. The process of claim 1 wherein the saturation zone comprises a hydrotreater.

3. The process of claim 1 wherein the oligomerization zone feedstream contains at least 70 wt % isobutane.

4. The process of claim 1 wherein olefin concentration of the oligomerization zone feedstream is at least 50 wt % isobutene.

5. The process of 1 wherein said separation zone comprises a deisobutanizer, wherein said first input stream and said saturation zone effluent fraction are recovered from said deisobutanizer as a sidecut stream and passed to said dehydrogenation zone as a dehydrogenation zone feed and wherein a majority of $C_3$ and lighter hydrocarbons is withdrawn from said deisobutanizer as an overhead stream.

6. The process of claim 1 wherein said dehydrogenation zone catalyst comprises platinum, tin and potassium metals on an alumina base.

7. The process of claim 6 wherein said dehydrogenation zone catalyst further comprises theta alumina.

8. The process of claim 1 wherein said dehydrogenation zone operates at a pressure of from 30 to 110 psig.

9. The process of claim 1 wherein said dehydrogenation zone effluent is combined with a hydrogen stream having a hydrogen concentration in a range of from 70 to 90 wt %.

10. The process of claim 1 wherein said solid oligomerization zone catalyst comprises multiple beds of a solid phosphoric acid catalyst.

11. The process of claim 1 wherein said saturation zone comprises at least two beds of hydrotreating catalyst.

12. The process of claim 1 wherein hydrogen from said dehydrogenation zone is charged to said saturation zone with said oligomerization effluent stream.

13. The process of claim 10 wherein a recycle stream comprising a fraction of $C_7$ or higher hydrocarbons from said saturation zone effluent is charged to said beds of solid phosphoric acid catalyst.

14. The process of claim 13 wherein said saturation zone effluent passes to a separator and a bottoms stream comprising said recycle is withdrawn from said separator.

15. The process of claim 1 wherein said saturation zone effluent passes to a separator and a separator bottoms stream comprising $C_8$ and heavier hydrocarbons is withdrawn from said separator and at least a portion of said separator bottoms stream is mixed with the feed to the oligomerization zone.

16. The process of claim 1 wherein said effluent from said oligomerization zone passes without separation into said saturation zone.

* * * * *